(12) United States Patent
Cote et al.

(10) Patent No.: US 6,499,639 B2
(45) Date of Patent: Dec. 31, 2002

(54) METHOD AND APPARATUS FOR DYNAMICALLY CONTROLLING A WEB PRINTING PRESS

(75) Inventors: Kevin Lauren Cote, Durham, NH (US); Neil Doherty, Durham, NH (US); Lothar John Schroeder, Portsmouth, NH (US); Lawrence Edward Zagar, Rochester, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/782,455

(22) Filed: Feb. 12, 2001

(65) Prior Publication Data

US 2002/0108983 A1 Aug. 15, 2002

(51) Int. Cl.$^7$ .......................... B65H 23/18; B65H 20/24
(52) U.S. Cl. .......................... 226/42; 226/44; 226/111; 226/91
(58) Field of Search .......................... 226/42, 44, 91, 226/111, 118.3

(56) References Cited

U.S. PATENT DOCUMENTS

| | | | | | |
|---|---|---|---|---|---|
| 2,605,101 A | * | 7/1952 | Lessmann | .................... | 226/42 |
| 3,119,537 A | * | 1/1964 | Smits | .................... | 226/111 |
| 3,561,654 A | * | 2/1971 | Greiner | .................... | 226/111 |
| 3,667,664 A | * | 6/1972 | Schroeder | .................... | 226/111 |
| 4,997,120 A | * | 3/1991 | Tanaka et al. | .................. | 226/44 |
| 5,318,796 A | * | 6/1994 | Torpey et al. | .................. | 226/44 |
| 5,365,844 A | * | 11/1994 | Miyashige | .................... | 226/42 |
| 5,524,805 A | * | 6/1996 | Shiba et al. | .................. | 101/425 |
| 5,771,805 A | * | 6/1998 | Branas et al. | ................. | 101/183 |
| 5,791,541 A | * | 8/1998 | Jitsuishi et al. | ................ | 226/44 |
| 6,176,410 B1 | * | 1/2001 | Ueda et al. | .................. | 226/111 |
| 6,213,367 B1 | * | 4/2001 | Flamm | .................... | 226/42 |
| 6,273,314 B1 | * | 8/2001 | Promoli | .................... | 226/42 |

FOREIGN PATENT DOCUMENTS

EP          0933201          8/1999

* cited by examiner

*Primary Examiner*—Michael R. Mansen
(74) *Attorney, Agent, or Firm*—Davidson, Davidson & Kappel, LLC

(57) ABSTRACT

A method for dynamically controlling a driver of a nip roller in a web printing press includes controlling the speed of the driver in a tension-control mode during a phase of printing press operation and in a velocity-control mode during another phase of printing press operation. The controlling of the speed of the driver in the tension-control mode is based on the tension in the web upstream of the nip roller so as to maintain the tension at a desired tension value. The controlling of the speed of the driver in the velocity-control mode is based on a predetermined driver velocity ratio for maintaining the web tension. The tension-control mode may be employed during press start-up as the web accelerates to operating speed. The velocity-control mode may be used during printing operations of the press.

24 Claims, 3 Drawing Sheets

METHOD AND APPARATUS FOR DYNAMICALLY CONTROLLING A WEB PRINTING PRESS

BACKGROUND OF THE INVENTION

1. Field of the Invention

The present invention relates generally to web printing presses and more particularly to a method and apparatus for dynamically controlling a driver of a nip roller in a web printing press.

2. Background Information

Web printing presses print a continuous web of material, such as paper. Tension in the web must be maintained within a desired range in order to achieve smooth operation of the printing press. Paper differences, environmental conditions in the pressroom, as well as press evolutions such as web splicing and blanket washing, may cause web tension variations. At the same time, the velocity of the web, and hence the rotational speed of non-slip nip rollers moving the web, must be held relatively constant to achieve good print product quality. Some prior printing presses have controlled the speed of the non-slip nip rollers. These presses require the intervention of a skilled operator to achieve acceptable web tensions. Some prior printing presses have controlled the web tension. These presses may have compromised print product quality.

European Patent Document No. EP 0 933 201 A1 describes a method for controlling the nip roller driver in a web printing press based on a load torque adjusted according to load characteristic curve. hi this way, the driver purportedly produces a desired rotational speed of the nip roller and at the same time a desired web tension.

BRIEF SUMMARY OF THE INVENTION

An object of the present invention is to provide a web printing press control scheme which changes according to the phase of printing press operation.

The present invention provides a method for dynamically controlling a driver of a nip roller in a web printing press, the method comprising: controlling a speed of the driver in a tension-control mode during a first phase of printing press operation, the controlling of the speed of the driver in the tension-control mode being based on a tension in the web upstream of the nip roller so as to maintain the tension at a first desired tension value; and controlling the speed of the driver in a velocity-control mode during a second phase of printing press operation, the controlling of the speed of the driver in the velocity-control mode being based on a driver velocity ratio.

According to the present invention, the control mode of the nip roller driver is thus adapted to the particular operating phase of the printing press.

The tension maintained according to the present invention may be a measured or estimated tension in the upstream web. The desired tension value may be derived from an operator input or from a previously determined set of tension set points which are a function of a type of paper of the web and/or an operating condition of the web printing press.

The first phase of printing press operation may include acceleration of the nip roller driver to a steady-state speed during a start-up of the printing press. Tension-control of the driver speed is desirable during start-up and acceleration to make-ready speed since printing has not yet commenced and print quality is therefore not an issue.

The second phase of printing press operation may include a printing operation of the printing press. Once printing has started, velocity control of the nip roller driver is implemented to maintain print product quality.

The driver velocity ratio used in the velocity-control mode is a ratio of the speed of the driver needed to produce a given desired web tension value to the value of the command, or nominal, velocity of the web printing press.

The driver velocity ratio may be determined during a transition phase of printing press operation when the driver is at the steady-state speed.

The method according to the present invention may further comprise: controlling the torque of the driver during a webbing-up phase of printing press operation at a torque value a given amount above a breakaway torque and below a web breaking torque; and controlling the speed of the driver during the webbing-up phase below a maximum velocity limit so as to prevent a driver overspeed condition when the tension in the web is low or zero.

During the webbing-up phase, the driver torque may thus be set to provide measurable tension in the upstream web span, but low enough to avoid web breaking. Since there may be no web yet present at the beginning of the webbing-up phase, an upper driver velocity limit is imposed to prevent overspeed of the driver when there is no web tension to match the driver torque. The press may remain in the webbing-up mode until measurable web tension had been developed.

Furthermore, according to the present invention, control of the driver speed may be switched from the velocity-control mode to the tension-control mode. This may be desirable when the web tension moves, or is likely to move, outside of an acceptable web tension limit band, or periodically. Times when the web tension is likely to move outside of an acceptable tension limit band include press blanket wash cycles and web splicing cycles. Also, the web tension may move out of an acceptable tension limit band due to temperature, humidity and paper changes. Additionally, control of the driver speed may be switched from the velocity-control mode to the tension-control mode in response to an operator input, or simply periodically.

Once the driver control has been switched back to velocity-control mode, a revised velocity ratio may be determined during a time when the driver is at a steady-state speed. Then driver control may be switched back to velocity-control mode using the new velocity ratio.

Furthermore, to reduce the likelihood of a web break, driver control may be switched to tension-control mode in the event of an emergency stop of the printing press.

The present invention also provides an apparatus for dynamically controlling a driver of a nip roller in a web printing press, the apparatus comprising a tension control device for modifying a speed of the driver based on a tension in the web upstream of the nip roller in a tension-control mode during a first phase of printing press operation so as to maintain the tension at a first desired tension value; and a speed control device for controlling the speed of the driver in a velocity-control mode during a second phase of printing press operation, the controlling of the speed of the driver in the velocity-control mode being based on a driver velocity ratio.

BRIEF DESCRIPTION OF THE DRAWINGS

The present invention is elaborated upon below with reference to the drawings, in which.

DETAILED DESCRIPTION

Figure 1:
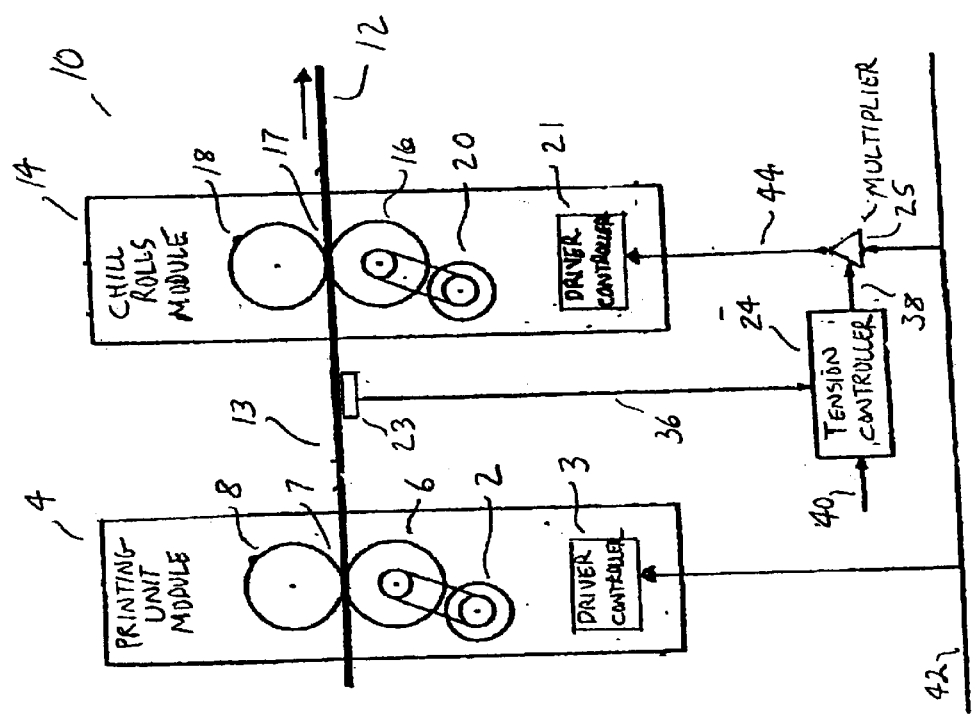
FIG. 1 shows a schematic diagram of a web printing press operating in a tension-control mode.

FIG. 1 shows a schematic diagram of web printing press 10 operating in a tension-control mode. Web 12 is moved by driven nips 7 and 17 in modules 4 and 14, respectively. Nip 7 is formed by nip rollers 6 and 8, while nip 17 is formed by nip rollers 16 and 18. Nip rollers 6 and 8 are non-slip nip rollers. In a tension-control mode, nip rollers 6 and 8 may operate in a non-slip condition, but may also satisfactorily operate with an insubstantial amount of slip in a "no gross-slip" condition. As indicated, module 4 is a printing module and module 14 is a chill rolls module of printing press 10. Modules 4 and 14 may be other types of modules and printing press 10 may include other, or more of the same, modules. Web span 13 upstream of module 14 is formed between nips 7 and 17.

Nip roller 6 is a non-slip driven nip roller driven by a nip roller driver 2, while nip roller 16 is a non-slip driven nip roller driven by a nip roller driver 20. Nip roller drivers 2 and 20 may each be, for example, an electric motor, or other type of suitable driver. Module 4 includes driver controller 3 for controlling nip roller driver 2, while module 14 includes driver controller 21 for controlling nip roller driver 20. Driver controllers 3 and 21 may be any type of suitable driver-controlling device, such as a motor controller, microprocessor, or other device appropriate to the driver type.

Upstream from nip 17, tension sensor 23 provides tension signal 36, which is proportional to the tension in upstream web span 13, to tension controller 24. Tension sensor 23 may be, for example, a transducer, or other type of device for sensing the tension in a web span. In other embodiments according to the present invention, tension signal 36 may be derived from an estimated or indirectly-measured tension in upstream web span 13. Tension controller 24 provides driver velocity ratio signal 38 to multiplier 25 based on the difference in tension signal 36, received from tension sensor 23, and command tension signal 40, received from a press control system (not shown). The command tension signal may be a desired tension value derived from an operator input and/or from a previously-determined file of tension set points appropriate to a given type of paper of web 12 and/or operating condition of press 10, for example. Tension controller 24 may be a programmable logic controller, microprocessor, or other suitable device as would be understood by a person of skill in the art.

Multiplier 25 modifies command speed signal 42, received from the press control system, based on driver velocity ratio signal 38. Command speed signal 42 represents a press command, or nominal, speed. Driver velocity ratio signal 38 provides a driver velocity ratio, the driver velocity ratio being a ratio of the speed of nip roller driver 20 needed to produce a given desired tension in web span 13 to a value of command speed signal 42. Driver velocity ratio signal 38 may be viewed as a velocity gain applied to the press command speed as necessary to produce a desired web tension value. Multiplier 25 provides modified command speed signal 44 to driver controller 21, which controls nip roller driver 20. Multiplier 25 may be a solid state device or microprocessor, for example.

Because it is a printing unit module, module 4 must maintain a synchronous nip roller speed relative to, for example, a downstream folder module (not shown). Therefore, module 4 does not have an associated tension controller or multiplier.

During operation in the tension control mode, tension controller 24 modifies the driver velocity ratio applied in multiplier 25 so as to modify the command speed input to driver controller 21 to maintain a desired tension in web span 13. The tension control mode is preferably used, for example, during start-up of the press when the web is being accelerated to make-ready speed. The press may be shifted to tension control mode when excessive tension variations in the web could occur or are already occurring. Such situations include changes in environmental parameters, such as pressroom temperature and humidity, or certain printing press operations, such as blanket wash and roll splicing. Additionally, the press may be shifted to tension control mode periodically, or when desired, to re-determine the driver velocity ratio.

Figure 2:
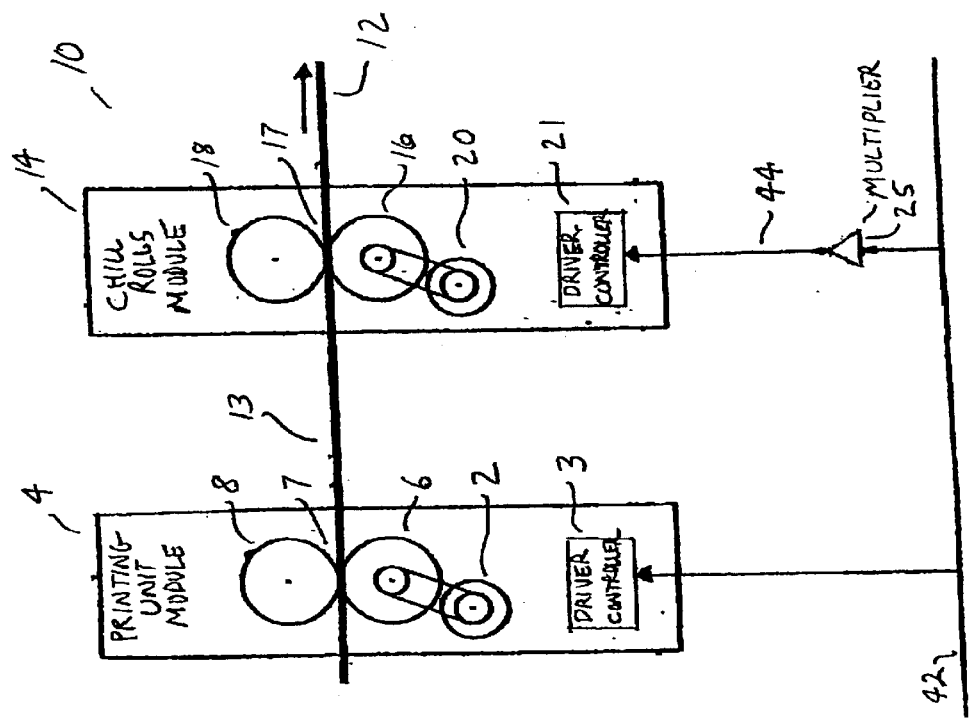
FIG. 2 shows a schematic diagram of a web printing press operating in a velocity-control mode.

FIG. 2 shows a schematic diagram of a web printing press operating in a velocity-control mode. The numbering scheme in FIG. 2 corresponds to that in FIG. 1. In the velocity-control mode, command speed 42 is modified in multiplier 25 according to a previously-determined driver velocity ratio. As discussed above, the driver velocity ratio is the ratio of the speed of nip roller driver 20 needed to achieve a desired tension in web span 13 to the value of command velocity 42. The previously-determined driver velocity ratio applied in the velocity-control mode is provided via driver velocity ratio signal 38 during operation in the tension-control mode and then captured, or stored, in multiplier 25. The previously-determined driver velocity ratio applied in the velocity-control mode may be determined at a steady-state web speed condition during a transition phase while in tension-control mode before a change to velocity-control mode. As in the tension control mode, multiplier 25 provides modified command speed signal 44 to driver controller 21, which controls the speed of nip roller driver 20. Velocity-control mode is preferably used during printing operations of the press.

Figure 3:
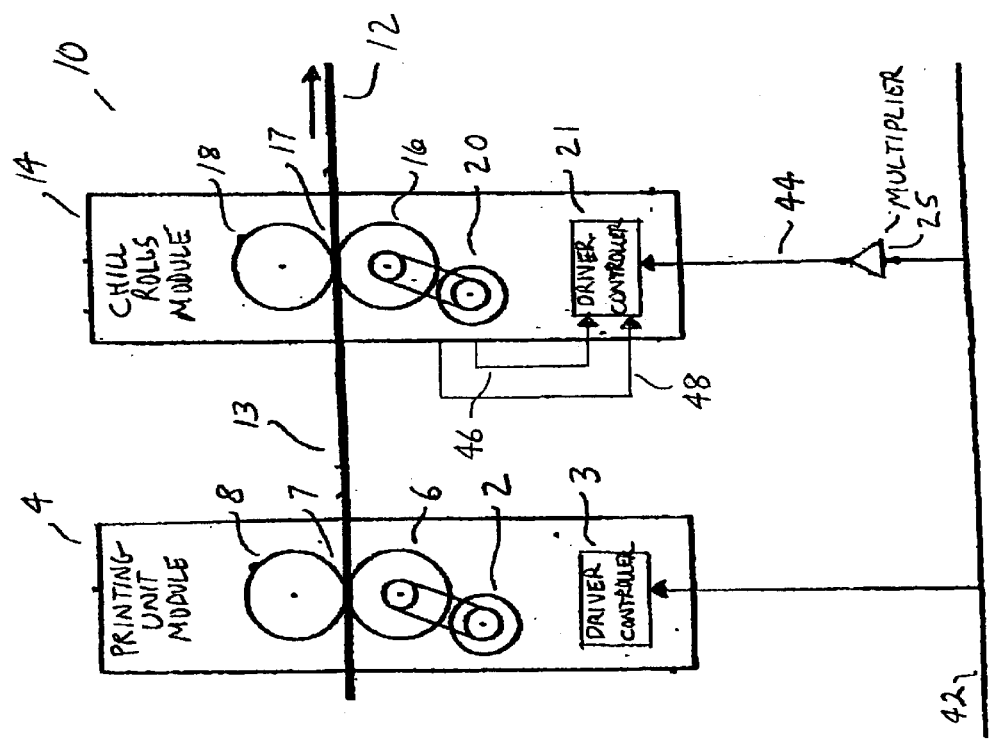
FIG. 3 shows a schematic diagram of a web printing press operating in a torque-control with speed limit mode.

FIG. 3 shows a schematic diagram of a web printing press operating in a torque-control with speed limit mode. In the torque-control mode, driver controller 21 varies the speed of nip roller driver 20 as necessary to maintain the output torque, as indicated by load torque signal 48, at a predefined torque difference above breakaway torque. The predefined torque difference is selected so as to provide a measurable tension in upstream web span 13, but low enough to avoid web breaks. Driver controller 21 also imposes a maximum speed limit on driver 20 which overrides the requirement to maintain driver torque. Driver speed control signal 46 provides the speed of nip roller driver 20 to driver controller 21.

The torque-control with speed limit mode is preferably employed during webbing-up of the press. Since there may be no web present at the beginning of the webbing-up phase, the driver speed limit is imposed to prevent driver overspeed during periods when there is no web tension to match driver torque.

The operating mode of printing press 10 may be changed as necessary, depending on the operational phase of the press. For example, during webbing-up of the press, the torque-control with speed limit mode may be used until measurable web tension has developed. Then during acceleration of the press to make-ready speed, the tension control may be used. While in tension control mode, once a steady-state web speed has been established, a transition mode may be activated in which the driver velocity ratio may be determined. Then the press may be switched to velocity control mode, in which the determined driver velocity ratio is used. In the face of actual or expected excessive web tension variations, the press may be switched to tension control for calculation of a revised driver velocity ratio, with transition back to the velocity control mode using the new driver velocity ratio. Additionally, to reduce the likelihood of a web break, the control scheme may be switched to tension control in the event of an emergency stopping of the press. The operating mode of the printing press may be changed automatically or in response to an operator input.

What is claimed is:

1. A method for dynamically controlling a web printing press having a nip roller and a driver of the nip roller, the method comprising:

controlling a speed of the driver in a tension-control mode during a first phase of printing press operation, the controlling of the speed of the driver in the tension-control mode being a function of a tension in a web upstream of the nip roller so as to maintain the tension at a first desired tension value, the web moving continuously through the printing press during the tension-control mode; and controlling the speed of the driver in a velocity-control mode during a second phase of printing press operation, the controlling of the speed of the driver in the velocity-control mode being a function of a driver velocity ratio, the driver velocity ratio being a ratio of the speed of the driver for producing a second desired tension value with respect to a command speed of the printing press.

2. The method as recited in claim 1 wherein the first phase includes acceleration of the driver to a steady-state speed during a start-up of the printing press.

3. The method as recited in claim 1 wherein the second phase includes a printing operation of the printing press.

4. The method as recited in claim 1 further comprising determining the driver velocity ratio during a transition phase of printing press operation in which the driver is at a steady-state speed, the transition phase occurring during the tension control mode prior to the velocity control mode phase.

5. The method as recited in claim 1 further comprising:

controlling a torque of the driver during a webbing-up phase of printing press operation at a torque value a given amount above a breakaway torque and below a web breaking torque, a lead edge of a web being fed through the printing press during the webbing-up phase; and controlling the speed of the driver during the webbing-up phase below a maximum velocity limit so as to prevent a driver overspeed condition when the tension in the web is low or zero, the webbing-up phase occurring before the first and second phases, and the controlling of the torque during the webbing-up phase and the controlling of the speed of the driver during the webbing up phase defining a torque-control with speed limit mode.

6. The method as recited in claim 1 further comprising switching from the velocity-control mode to the tension-control mode when the tension is sensed during the velocity-control mode and moves outside of an acceptable web tension limit band, when the tension during the velocity control mode is likely to move outside of an acceptable web tension limit band, in response to an operator input, or periodically.

7. The method as recited in claim 6 wherein the switching step occurs when the printing press enters a blanket wash cycle where a blanket of the printing press is washed or a web splicing cycle when the web is spliced.

8. The method as recited in claim 6 further comprising subsequently switching back to controlling the speed of the driver in the velocity-control mode.

9. The method as recited in claim 8 wherein the driver velocity ratio is proportional to a ratio of the speed of the driver needed to produce a given desired tension value to a value of a velocity command of the web printing press and further comprising determining a revised velocity ratio during a time when the driver is at a steady-state speed before the switching back to the controlling the speed of the driver in the velocity-control mode.

10. The method as recited in claim 1 further comprising sensing an emergency stop condition of the web printing press and switching to the tension-control mode when the emergency stop condition of the web printing press is sensed.

11. The method as recited in claim 1 wherein the driver is a motor.

12. The method as recited in claim 1 wherein the nip roller is a non-slip nip roller.

13. The method as recited in claim 1 wherein the tension is a measured tension.

14. The method as recited in claim 1 wherein the first desired tension value is derived from at least one of an operator input and a previously determined set of tension set points, the set of tension set points being a function of at least one of a type of paper of the web and an operating condition of the web printing press.

15. A method for dynamically controlling a web printing press having a nip roller and a driver of the nip roller, the method comprising:

controlling a speed of the driver in a tension-control mode during a start-up phase of operation of the printing press, the controlling of the speed of the driver in the tension-control mode being based on the upstream web tension so as to maintain the tension at a first desired tension value, the web moving continuously through the printing press in the tension-control mode; then achieving a steady-state speed of the driver; then determining a driver velocity ratio during a transition phase of the printing press operation, the driver being at the steady-state speed during the transition phase, the velocity ratio being a ratio of the speed of the driver needed to produce a given desired tension value to a value of a velocity command of the web printing press; then controlling the speed of the driver in a velocity-control mode during a printing phase of the printing press operation, the controlling of the speed of the driver in the velocity-control mode being based on the driver velocity ratio for maintaining the tension at a second desired tension value; then switching to the tension-control mode when the tension is sensed during the velocity-control mode and the tension moves outside of a desired web tension limit band, a time when the tension during the velocity control mode is likely to move outside of the desired web tension limit band, in response to an operator input, or periodically; then determining a revised driver velocity ratio during a time when the driver is at another steady-state speed in the tension-control mode; and then switching to the velocity-control mode using the revised driver velocity ratio.

16. The method as recited in claim 15 further comprising, upon an initiation of an emergency stop condition of the printing press, switching to the controlling the speed of the driver in the tension-control mode after the switching to the controlling the speed of the driver in the velocity-control mode using the revised driver velocity ratio.

17. The method as recited in claim 15 wherein the tension is a measured tension.

18. The method as recited in claim 15 wherein the first desired tension value is derived from at least one of an operator input and a previously determined set of tension set points, the set of tension set points being a function of at least one of a type of paper of the web and an operating condition of the web printing press.

19. An apparatus for dynamically controlling a web printing press having a nip roller contacting a web, the apparatus comprising:

a driver for the nip roller;

a tension control device for modifying a speed of the driver based on a tension in the web upstream of the nip roller in a tension-control mode during a first phase of printing press operation so as to maintain the tension at a first desired tension value, the web moving continuously through the printing press in the tension-control mode; and a speed control device for controlling the speed of the driver in a velocity-control mode during a second phase of printing press operation, the controlling of the speed of the driver in the velocity-control mode being based on a driver velocity ratio, the driver velocity ratio being a ratio of the speed of the driver for producing a second desired tension value with respect to a command speed of the printing press.

20. The apparatus as recited in claim 19 wherein the first phase includes acceleration of the driver to a steady-state speed during a start-up of the printing press.

21. The apparatus as recited in claim 19 wherein the speed control device operates in the velocity control mode when the web is printed.

22. The apparatus as recited in claim 19 wherein the speed control device controls the speed of the driver during a webbing-up phase so as to control an output torque of the driver at a torque value a given amount above a breakaway torque and below a web breaking torque and the speed control device controls the speed of the driver during the webbing-up phase below a maximum velocity limit so as to prevent a driver overspeed condition when the tension in the web is low or zero, the output torque being a function of the speed of the driver and the webbing-up phase occurring before the first and second phases.

23. The apparatus as recited in claim 19 wherein the tension is a measured tension.

24. The apparatus as recited in claim 19 wherein the first desired tension value is derived from at least one of an operator input and a previously determined set of tension set points, the set of tension set points being a function of at least one of a type of paper of the web and an operating condition of the web printing press.

* * * * *